United States Patent
Perissinotto

(10) Patent No.: US 8,403,781 B2
(45) Date of Patent: Mar. 26, 2013

(54) TENSIONING APPARATUS WITH A BLOCKING DEVICE

(75) Inventor: Renzo Perissinotto, Dachau (DE)

(73) Assignee: IWIS Motorsysteme GmbH & Co., KG, Munich (DE)

( * ) Notice: Subject to any disclaimer, the term of this patent is extended or adjusted under 35 U.S.C. 154(b) by 163 days.

(21) Appl. No.: 12/674,656

(22) PCT Filed: Apr. 22, 2008

(86) PCT No.: PCT/EP2008/003229
§ 371 (c)(1),
(2), (4) Date: Feb. 22, 2010

(87) PCT Pub. No.: WO2009/024196
PCT Pub. Date: Feb. 26, 2009

(65) Prior Publication Data
US 2011/0195810 A1    Aug. 11, 2011

(30) Foreign Application Priority Data
Aug. 21, 2007   (DE) .................. 10 2007 039 438

(51) Int. Cl.
*F16H 7/08* (2006.01)
*B23P 11/00* (2006.01)

(52) U.S. Cl. ...................................... 474/101

(58) Field of Classification Search ............. 474/101, 474/103, 105, 111, 138
See application file for complete search history.

(56) References Cited

U.S. PATENT DOCUMENTS

| | | | | |
|---|---|---|---|---|
| 4,772,251 A * | 9/1988 | Goppelt et al. | | 474/101 |
| 4,792,322 A * | 12/1988 | Goppelt et al. | | 474/136 |
| 5,653,653 A * | 8/1997 | Ledvina | | 474/110 |
| 5,704,860 A * | 1/1998 | Stief | | 474/110 |
| 5,931,754 A * | 8/1999 | Stief et al. | | 474/109 |
| 5,967,921 A * | 10/1999 | Simpson et al. | | 474/110 |
| 6,120,402 A * | 9/2000 | Preston et al. | | 474/109 |
| 6,126,563 A * | 10/2000 | Simpson | | 474/110 |
| 6,244,982 B1 * | 6/2001 | Merelli | | 474/138 |
| 6,435,992 B2 * | 8/2002 | Wakabayashi et al. | | 474/101 |
| 6,916,264 B2 * | 7/2005 | Hashimoto et al. | | 474/109 |
| 7,189,174 B2 * | 3/2007 | Yamamoto et al. | | 474/109 |
| 2003/0125142 A1 * | 7/2003 | Hashimoto et al. | | 474/109 |
| 2007/0082773 A1 * | 4/2007 | Yamada et al. | | 474/109 |

FOREIGN PATENT DOCUMENTS

| | | |
|---|---|---|
| DE | 3636918 A1 | 5/1988 |
| DE | 10014700 A1 | 10/2001 |
| DE | 10 2005 048 412 A1 | 5/2006 |
| EP | 0657662 A2 | 6/1995 |
| JP | 2001-146946 A | 5/2001 |

* cited by examiner

*Primary Examiner* — Michael Mansen
*Assistant Examiner* — Mark K Buse
(74) *Attorney, Agent, or Firm* — Baker Hostetler LLP

(57) ABSTRACT

The present invention provides a tensioning device, in particular for a timing chain of an internal combustion engine, having a housing, a tensioning piston guided in a piston bore of the housing, and a locking means for limiting the retraction motion of the tensioning piston into the piston bore of the housing. The locking means comprises a locking ring arranged on the tensioning piston. Furthermore, the locking means comprises a separate locking sleeve that can be reversibly radially expanded and is arranged at one tensioning end of the housing to introduce the locking ring into the locking means in the retraction direction of the tensioning piston and to retain the locking ring in the locking means in the tensioning direction of the tensioning piston.

10 Claims, 3 Drawing Sheets

TENSIONING APPARATUS WITH A BLOCKING DEVICE

CROSS-REFERENCE TO RELATED APPLICATIONS

This application is a National Stage of International patent application PCT/EP2008/003229, filed on Apr. 22, 2008, which claims priority to foreign patent application DE 10 2007 039 438.3, filed on Aug. 21, 2007.

FIELD OF THE INVENTION

The present invention relates to a tensioning device, in particular for a timing chain of an internal combustion engine, having a housing, a tensioning piston guided in a piston bore of the housing, and locking means for limiting the retraction motion of the tensioning piston into the piston bore of the housing; the locking means comprises a locking ring arranged on the tensioning piston.

BACKGROUND OF THE INVENTION

Such tensioning devices are wide-spread and are in particular employed as chain tensioners in timing chain drives of internal combustion engines. Usually, they are arranged in the loose side of the chain drive, as during normal operation lower tension forces occur there on average, so that the pressure spring only has to be designed for these lower tension forces. These tensioning devices normally comprise a housing with a piston bore in which a tensioning piston is arranged which is pretensioned by means of the pressure spring. The hollow cylindrical tensioning piston forms a pressure chamber together with the piston bore of the housing, which chamber is filled with a hydraulic fluid for dampening the retraction motion of the tensioning piston. The pressure chamber is in communication with a hydraulic cycle, e.g. the engine oil cycle of an internal combustion engine, via a check valve to replace the hydraulic fluid escaping from the pressure chamber via a leakage gap formed by the piston and the tensioner housing, or via a corresponding vent hole.

Such tensioning devices often comprise locking means which prevent the retraction of the tensioning piston into the housing beyond a predetermined stop but permit further readjustment of the tensioner, e.g. in case of chain wear. For this, a front region of the tensioning piston which is not exposed to the pressure chamber is conventionally provided with a lateral toothing cooperating with a ratchet element. The pretensioned ratchet element permits the tensioning piston to slip through in the tensioning direction of the pressure spring and simultaneously prevents excessive retraction of the tensioning piston into the piston bore of the housing in case of relatively hard and strong vibration impacts. Such a tensioning device is known from DE 10014700 A1, where the piston pretensioned by the spring comprises two ratchet sections essentially arranged oppositely and in which the serrated profiling of the separate ratchet element engages.

Moreover, there are also tensioning devices with locking means which take care that a latching effect occurs and the tensioning piston can no longer be retracted in the piston bore when the pressure in the hydraulic cycle is not high enough, e.g. when the engine is being switched off and started. Such a tensioning device is known from EP 657662 A2. This tensioning device comprises a tensioning piston having several catch grooves at its outside circumference into which a spring-loaded catch piston engages. The front face of the catch piston is beveled and the pressure of the hydraulic medium can act on it so that it becomes disengaged. By the locking position of the catch piston, a certain degree of pretension is maintained even while the engine is standing still, despite a possible leakage of the hydraulic medium from the pressure chamber. With each new start up of the tensioning device, a certain tension therefore exists independently of the pressure in the hydraulic cycle. As soon as in the hydraulic cycle and thus also in the pressure chamber of the tensioning device sufficient pressure has built up, the hydraulic pressure also disengages the latching means and the tensioning piston operates in a conventional manner.

A generic tensioning device is known from DE 3636918 A1. The tensioning piston that can be extended from the piston bore of a fixed adjuster housing acts on the flexible drive means in the tensioning direction. At the first startup of the tensioning device, the locking ring arranged on the piston snaps into a first catch position of the adjuster housing. If the pressure of the hydraulic medium in the pressure chamber is no longer sufficient to stop the piston during a retraction motion, e.g. during startup or in case of strong vibration impacts, the locking ring hits a stop edge of the piston, whereby the retraction motion of the piston into the piston bore is limited. If in case of wear of the drive means the initial position of the locking ring is no longer sufficient to define a suited working range of the tensioning piston, the locking ring is automatically moved to the next catch point of the adjuster housing by a second stop edge.

Such tensioning devices with ratchet elements or locking rings to limit the retraction motion of the tensioning piston into the housing are wide-spread and have proved themselves in use. The corresponding constructions of the locking means have a relatively elaborate design, where a partially complex manufacture and the observation of narrow tolerances are required for secure function.

Furthermore, these locking means usually consist of a series of components that have to be assembled in a complex manner and locked in a transport and/or assembly position.

SUMMARY OF THE INVENTION

In view of the disadvantages of the tensioning devices known from prior art, it is therefore an object of the present invention to simplify the construction of a tensioning device with locking means of the type mentioned in the beginning.

According to the invention, this object is achieved by the locking means comprising a retainer which is arranged at a tensioning end of the housing and can be reversibly radially expanded to introduce the locking ring into the locking means in the retraction direction of the tensioning piston and to hold the locking ring in the locking means in the tensioning direction of the tensioning piston. In contrast to the complex constructions and large structural volumes of conventional locking means for tensioning devices, in the embodiment according to the invention only a few simple components are required to restrict the active travel of the tensioning piston and to lock the retraction motion of the tensioning piston into the piston bore in case of strong vibrations or during start up (prevention of start chatter). The tensioning device according to the invention further realizes locking means with a very small structural volume that can be integrated in the existing dimensions of the housing and tensioning piston without any additional requirements being placed on the manufacture of the components. For example, apart from the use of standard components, simple inexpensive elements can be used. After the locking ring arranged on the tensioning piston has been received in the locking means by the first introduction of the tensioning piston into the piston bore of the housing, the ring of the locking means is retained in the locking means and possibly shifted on the piston during an extension motion of the tensioning piston. Thus, the locking means defines the travel of the tensioning piston.

One preferred embodiment provides for the retainer to be embodied as a separate sleeve fixed to the housing. A separate locking sleeve permits a simple manufacture of the tensioning device wherein the locking means is fabricated independently of the housing and subsequently mounted separately. In the process, the separate sleeve can be fixed to the housing by means of permanent as well as detachable connections, e.g. by welding, soldering or gluing, but also by screwing, clamping or catching.

The sleeve can favorably comprise an internally bent projection at the housing's side which engages in a groove at the housing to fix the sleeve to the housing. Such a catch-like connection permits a quick and inexpensive and nevertheless secure mounting of the sleeve to the housing. The sleeve favorably comprises one or several surrounding projections which can also be embodied as bent over wings/end regions of the sleeve itself.

For a simple readjustment of the locking ring on the tensioning piston, the sleeve can comprise an internally bent projection on the tensioning side which retains the locking ring in the tensioning direction or extending direction of the tensioning piston in the locking means. Due to the identical or similar embodiment of the internally bent projection on the housing's side and the tensioning side of the sleeve, in particular in the form of internally bent wings/end regions of the sleeve, manufacture can be facilitated and it is possible to mount the sleeve at alternate sides.

One advantageous embodiment of the invention provides for the sleeve to be formed by a meandering belt. Such a meandering belt is for example obtained by incising or slotting the sleeve alternately from both front sides, where the slots extend over more than one half, preferably more than 70% of the length of the sleeve. Forming the sleeve of a meandering belt permits the manufacture of the sleeve of a stable material having high strength, for example plastics or steel, in particular spring steel, while nevertheless radially flexible properties are allowed for, although the retainer or the retainer cage is still embodied rigidly axially to the axis of the tensioning piston. The meandering belt is shaped to a sleeve (in abutment, overlapping, ends connected or not, etc.). It is also possible to mold the sleeve as molded part (in this case, the belt and sleeve are produced quasi in one single operation).

A stop can be preferably provided at the tensioning end of the housing, wherein the stop locks the retraction motion of the tensioning piston when it contacts the locking ring. This simple construction permits a secure limitation of the retraction motion without requiring any additional components for this.

To securely position the locking ring on the piston, the outside wall of the tensioning piston can be provided with grooves, the locking ring being received in these grooves. The grooves prevent the locking ring from sliding on the tensioning piston in the locked position. Alternatively, the locking ring can also become jammed on the piston, so that no grooves on the piston are required in such an embodiment. Suitably, the grooves surround the outer wall of the piston and are separated from each other by an also surrounding web. The flutes surrounding the circumference of the piston permit the locking ring to be securely retained on the tensioning piston, as compared to grooves that are only arranged in some sections of the circumference, although the surrounding flutes have a lower depth than the grooves arranged in some sections. The webs between the grooves, which preferably have a wedge-like design, prevent a movement of the locking ring on the tensioning piston during the refraction motion and nevertheless permit the locking ring to easily slip over into the next groove, in particular if the beveled side of the wedge-shaped webs is arranged in the direction of the extending motion, i.e. they permit the readjustment of the tensioning device. In the process, the locking ring must be at least partially radially expandable to permit it to slip over the web to the next groove where it then elastically contracts again to realize the locking effect.

One advantageous embodiment provides for the tensioning device to be embodied as screw-in adjuster. Thanks to the small structural volume of the locking means, the embodiment of the tensioning device according to the invention is particularly suited for screw-in adjusters. Moreover, the locking means can also be employed in all conventional flange-type tensioning devices. Favorably, the outside diameter of the sleeve is here smaller than the core diameter of the screw-in thread. The adjustment of the diameter of the sleeve to the diameter of the thread permits to screw in the preassembled adjuster into a corresponding tapped bore to receive the tensioning device without any further operations in the final assembly. For preassembling the tensioning device at the manufacturer's, the tensioning piston is received in the piston bore and secured by calking in the housing, where applicable a locking sleeve is shifted over the piston and fixed to the housing, and the locking ring is shifted onto the tensioning piston into its first groove, i.e. it is not yet introduced into the locking means. In this transport position, the tensioning device is pushed into a corresponding opening and fixed or, in case of a screw-in adjuster, screwed in, at the final assembly without any further preparation. In the process, the tensioning piston moves into the piston bore of the housing until the locking ring is introduced into the locking means. The final assembly thus permits to make the locking means operate without any further unlocking.

The present invention furthermore relates to a method for activating a return interlock or locking means for a preassembled screw-in tensioner with a housing and a tensioning piston guided in a piston bore of the housing, wherein a first part of the return interlock is arranged at the housing and a second part of the return interlock is arranged at the tensioning piston separately from the first part. The method comprises screwing in the preassembled screw-in tensioner into a corresponding final assembly opening, usually a tapped bore in the engine block of an internal combustion engine, touching the tensioning element to be tensioned by the screw-in tensioner, introducing the tensioning piston into the piston bore of the housing by further screwing in the screw-in tensioner into the final assembly opening, and interlocking the first and the second parts of the return interlock and activating the return interlock. In contrast to conventional tensioning devices with a locking means or return interlock operatively assembled during preassembly, the method according to the invention permits to avoid the usually necessary latching of the locking means after preassembly and the corresponding unlatching after final assembly. In the method according to the invention, the first and the second parts of the return interlock are arranged separately in the axial direction after preassembly of the screw-in tensioner, where the axial distance of the first and the second parts is preferably smaller than the screw-in path of the tensioner in the corresponding final assembly opening. In an advantageous embodiment of the return interlock of which the working range can be adjusted, the first part of the return interlock is a reversibly radially expandable locking sleeve arranged at one tensioning end of the housing, and the second part is a locking ring arranged on the tensioning piston which, during the retraction motion of the tensioning piston into the piston bore during final assembly, first radially expands the locking sleeve and is then received in the locking sleeve.

BRIEF DESCRIPTION OF THE DRAWINGS

Below, the construction and function of the tensioning device according to the invention will be illustrated more in detail with reference to the enclosed drawings and one embodiment. In the drawings.

DETAILED DESCRIPTION

Figure 1:
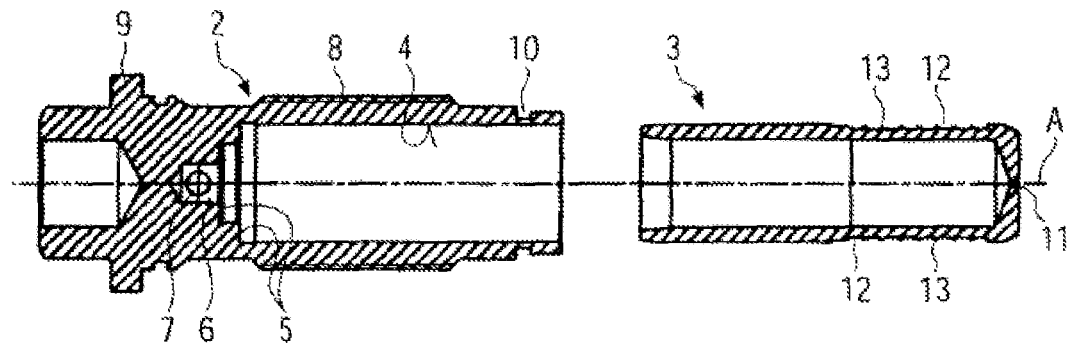
FIG. 1 shows a cross-section through a housing and a tensioning piston for a tensioning device according to the invention in a not assembled state.

FIG. 1 shows a hollow cylindrical housing 2 and an also hollow cylindrical tensioning piston 3 for a tensioning device 1 according to the invention for the timing chain drive of an internal combustion engine. A piston bore 4 is provided in the hollow cylindrical part of the housing 2 in which the tensioning piston 3 can be guided moving in the longitudinal direction with respect to axis A. At the bottom of the piston bore 4, a seat 5 for receiving the check valve and a chamber 6 are provided. The chamber 6 is connected to a non-depicted hydraulic system via a bore 7, preferably to the oil cycle of an internal combustion engine. The housing 2 furthermore comprises a threaded section 8 on its outside circumference as well as a flange 9 in the base area of the housing. With the threaded section 8, the tensioning device 1 can be mounted in the engine block of an internal combustion engine, where the flange 9 limits the screwing in of the tensioning device 1. Alternatively, the housing 2 or the tensioning device 1, respectively, can also be designed as flange housing or flange tensioning device. At the tensioning end of the housing 2, i.e. at the open front face of the hollow cylindrical housing 2, a groove 10 is provided at the outside circumference in addition to the otherwise conventional embodiment of the housing.

The tensioning piston 3 is also essentially designed like a conventional tensioning piston, and at the closed front face of the hollow cylindrical piston, i.e. at the tensioning side of the tensioning piston 3, it comprises a vent hole 11. In addition, several grooves or flutes 12 surrounding the outside circumference are provided in the front region of the tensioning piston 3, i.e. on the tensioning side, which are each separated by a wedge-shaped web 13.

Figure 2:
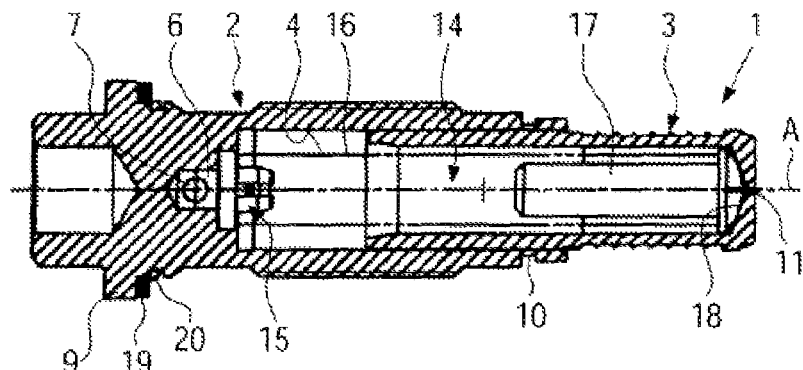
FIG. 2 shows a cross-section through the housing and the tensioning piston of FIG. 1 in an assembled state.

In FIG. 2, the housing 2 and the tensioning piston 3 are shown in the assembled state. Here, the tensioning piston 3 is received in the piston bore 4 of the housing 2 so as to move in the longitudinal direction, where the housing is calked at the open front face such that the tensioning piston 3 can no longer come out of the piston bore 4 after assembly. The housing 2 and the tensioning piston 3 together form a pressure chamber 14. The pressure chamber 14 is connected to the hydraulic system via a check valve 15 which is received in the seat 5 at the bottom of the piston bore 4, the chamber 6 filled with a hydraulic medium and the bore 7. The tensioning piston 3 is pretensioned with a helical pressure spring 16 in the axial direction. The pressure spring 16 is only schematically shown in FIG. 2. A packing element 17 is furthermore arranged in the hollow cylindrical tensioning piston 3 and reduces the volume of the pressure chamber 14 and with its head 18 seals the vent hole 11 on the front side in the tensioning piston 3 with respect to the pressure chamber 4 filled with the hydraulic medium. For this, the head 18 of the packing element 17 is pressed against the front end of the hollow cylindrical tensioning piston 3 by the pressure spring 16 which supports itself against the check valve 15. In front of the flange 9 of the housing 2, two sealing rings 19, 20 are provided in the tensioning direction which seal the tensioning device 1 in the finally assembled state in the engine block of an internal combustion engine.

Figure 3A:
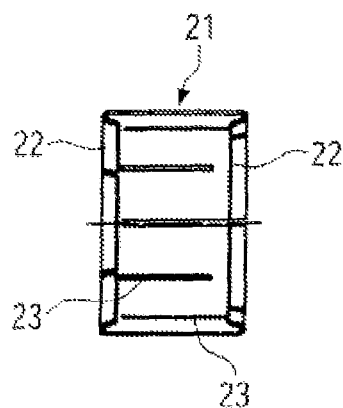
FIG. 3a shows a cross-section through a locking sleeve for a tensioning device according to the invention.

In FIG. 3a, a locking sleeve 21 is shown in a cross-section. The locking sleeve 21 preferably consists of steel, in particular spring steel. The front ends of the sleeve 21 are bent inwards on both sides, where the bent over sections of the sleeve project like wings with respect to the internal wall of the sleeve. The end of the wings 22 has the largest distance with respect to the internal wall of the sleeve 21. The locking sleeve 21 is furthermore alternately slotted from both front sides, where the slots 23 extend over 75% of the length of the locking sleeve with internally bent wings 22. By the slots being arranged in an alternating manner, the locking sleeve 21 is formed by a surrounding meandering belt which permits a radial expansion of the locking sleeve 21, but simultaneously also ensures the reversible return motion.

Figure 3B:
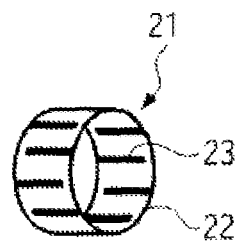
FIG. 3b shows a perspective view of the locking sleeve of FIG. 3a, FIG. 4a shows the tensioning device of FIG. 2 and the locking sleeve of FIG. 3 in an assembly arrangement.

FIG. 3b shows a perspective representation of the locking sleeve 21. As can be seen in FIGS. 3a and 3b, the locking sleeve 21 is embodied as symmetric part, despite the internally bent projecting wings 22 and the slots 23, and can therefore be used from both sides in the same manner.

Figure 4A:
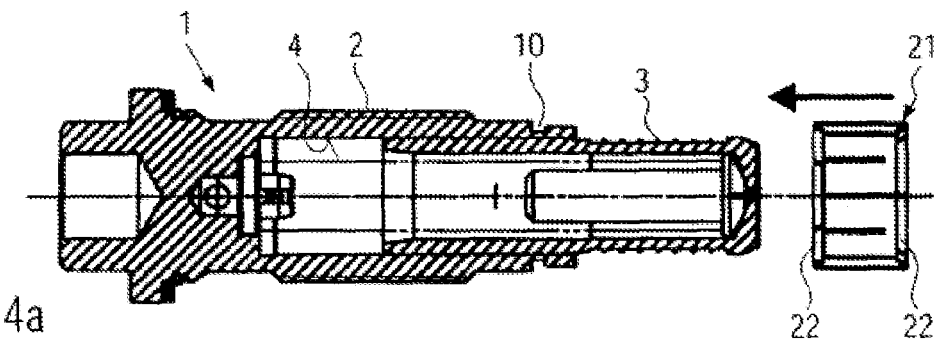
FIG. 4b shows the tensioning device of FIG. 2 and the locking sleeve of FIG. 3 in an assembled state.
Figure 4B:
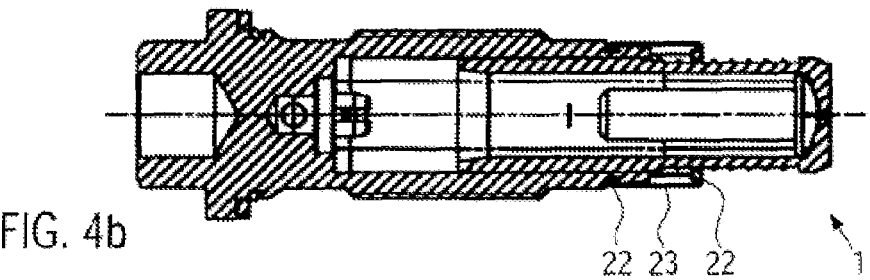

FIG. 4a shows the tensioning device 1 with the housing 2 and the tensioning piston 3 guided in the piston bore 4 of the housing 2 as well as the locking sleeve 21 in the assembly position in front of the tensioning end of the tensioning piston 3. During the assembly of the locking sleeve 21, the same is pushed over the head of the tensioning piston 3 on the tensioning side in the direction of arrow. In the process, the sleeve 21 is already slightly expanded to slide over the head of the tensioning piston 3. Alternatively, the head on the tensioning side can also be dimensioned such that it exactly fits through the opening of the locking sleeve 21 formed by the wings 22. The locking sleeve 21 is pushed over the tensioning piston 3 until it reaches the housing 2. When it is further pushed over the tensioning end of the housing 2, the locking sleeve 21 radially expands, and when it is further pushed over the outside wall of the housing, the wings 22 projecting inwards engage in the surrounding groove 10 and the locking sleeve 21 contracts again radially until it assumes its original state, as shown in FIG. 4b. The engagement of the locking sleeve 21 in the groove 10 with the internally projecting wings 22 permits a very simple and effective mounting of the locking sleeve at the housing 2.

Figure 5A:
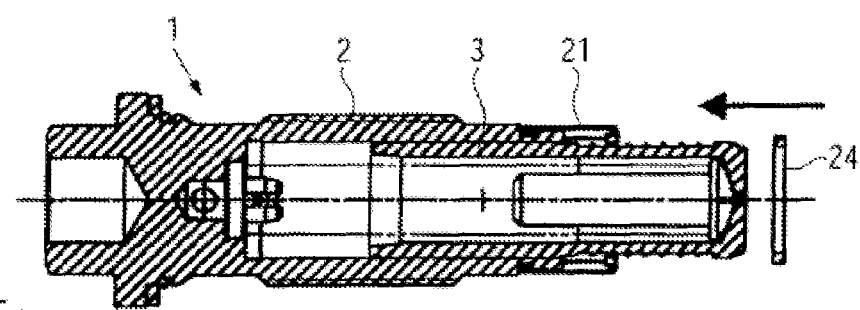
FIG. 5a shows the tensioning device of FIG. 4b and a locking ring for a tensioning device according to the invention in an assembly arrangement.

The tensioning device 1 of FIG. 5a with the locking sleeve 21 shifted onto it and caught corresponds to the tensioning device of FIG. 4b. Furthermore, a locking ring 24 is arranged in front of the tensioning end of the tensioning piston 3 for further preassembly. During assembly, the locking ring 24 is shifted onto the head of the tensioning piston 3 in the direction of arrow and over the head to the first surrounding flute 12 of the tensioning piston 3. For this, the locking ring has an elastic design, so that it correspondingly deforms radially to reach the first flute 12 over the head of the tensioning piston 3. Alternatively, the locking ring 24 can also be interrupted to permit the required radial deformation. Other constructive embodiments of the head of the tensioning piston 3 on the tensioning side and of the locking ring 24 which permit to shift the locking ring 24 over the head of the tensioning piston 3 to the first flute 12 are also possible.

Figure 5B:
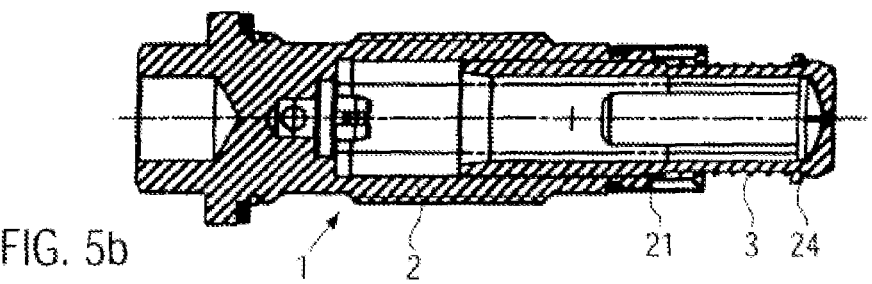
FIG. 5b shows the tensioning device of FIG. 4b and the locking ring in an assembled state.

At the end of preassembly, as shown in FIG. 5b, the tensioning device 1 is provided with a locking sleeve 21 shifted onto the housing 2 and a locking ring 24 shifted onto the tensioning piston 3.

Figure 6A:
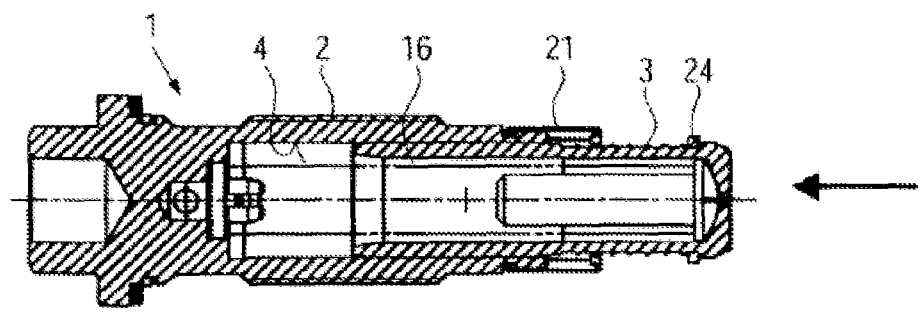
FIG. 6a shows the tensioning device of FIG. 5b in the transport state in a final assembly arrangement.
Figure 6B:
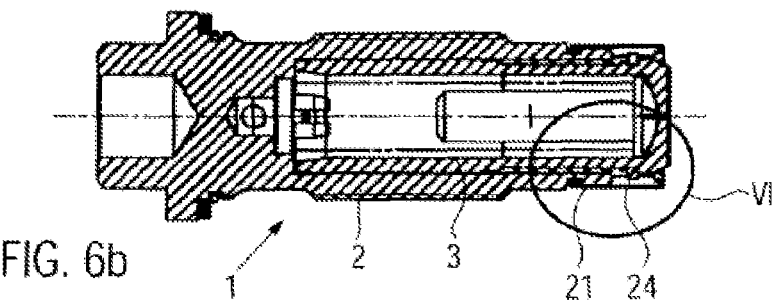
FIG. 6b shows the tensioning device according to the invention in the finally assembled state.

FIG. 6a shows the transport position and installation state of the tensioning device 1 with the locking sleeve 21 shifted onto the housing and the locking ring 24 positioned on the tensioning piston 3 corresponding to FIG. 5b. For or during final assembly, the tensioning piston 3 is, together with the locking ring 24, pushed into the piston bore 4 of the housing 2 in direction of arrow against the pretension of the pressure spring 16. As soon as the locking ring 24 reaches the locking sleeve 21, the locking sleeve 21 expands at the tensioning side until the locking ring 24 gets behind the internally projecting wings 22 of the locking sleeve 21 when the tensioning piston 3 is further shifted inside. Then, the locking sleeve 21 contracts again radially at the tensioning end, so that the locking ring 24 is located between the front side of the housing 2 at its tensioning end and the wings 22 of the locking sleeve 21, see FIG. 6b.

Figure 6C:
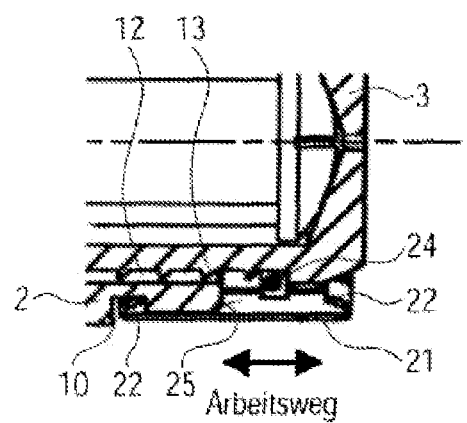
FIG. 6c shows an enlarged representation of detail VI of FIG. 6b.

FIG. 6c shows in detail the arrangement of the locking ring 24 between the wings 22 on the tensioning side of the locking sleeve and the front stop 25 at the tensioning end of the housing 2. The locking ring 24 can no longer travel beyond the wings 22 of the locking sleeve 21 when the piston 3 is extended. Equally, when the piston 3 is retracted into the housing 2, the further retraction motion of the tensioning piston into the piston bore is prevented when the locking ring 24 contacts the stop 25.

When the tensioning device 1 according to the invention is designed as a screw-in adjuster, the tensioning device 1 can be screwed into a corresponding opening at the engine block in the transport position which is shown in FIG. 6a without any preparation or subsequent unlatching. While it is being screwed in, the tensioning piston 3 is pressed into the piston bore 4 of the housing 2 until the locking ring 24 is received in the locking sleeve 21.

After the installation of the tensioning device 1 according to the invention, the tensioning piston 3 is, when it is put into operation for the first time, pushed forwards until the tensioning piston 3 generates sufficient pretension at a tensioning element (not shown) lying against the head of the tensioning piston 3, which is due to the pretension of the pressure spring 16 as well as due to the pressure of the hydraulic medium in the pressure chamber 14. If in the process the tensioning piston 3 exits from the piston bore 4 far enough for the locking ring 24 to hit the wings 22 of the locking sleeve, the locking ring 24 is retained in its position by the wings 22 of the locking sleeve 21, while the tensioning piston 3 further extends, so that the locking ring 24 slides over the wedge-shaped web 13 into the next flute 12. Here, the web 13 is beveled in the slipping direction of the locking ring 24 to permit the radial expansion of the locking ring and the slipping over into the next flute 12. Depending on the position of the locking ring 24 on one of the flutes 12 on the tensioning piston 3, the travel of the tensioning piston between the wings 22 is defined on the tensioning side of the locking sleeve 21 and the stop surface 25 at the front side of the housing 2.

If the tensioning piston 3 retracts due to heavy vibration impacts or due to a low hydraulic pressure when the internal combustion engine is started to such an extent that the locking ring 24 contacts the stop 25 at the housing 2, the retraction motion is locked as the locking ring 24 cannot radially expand at the straight side of the web 13.

In case of wear of the drive means tensioned by the tensioning device 1 according to the invention, the locking ring 24 contacts again the wings 22 on the tensioning side of the locking sleeve 21. If now the force applied by the pressure spring 16 and the hydraulic pressure in the pressure chamber 14 is sufficient to press the tensioning piston 3 further into the tensioning direction, the locking ring 24 radially expands again and slips over the next web 13 into the following flute 12. By this automatic readjustment of the tensioning device 1, the operating position of the tensioning piston 3 is changed without the travel being changed.

What is claimed is:

1. Tensioning device, comprising:
    a housing,
    a tensioning piston having an outer wall provided with grooves and guided in a piston bore of the housing, and
    a locking means, including a locking ring arranged on the tensioning piston, and a locking sleeve that can be reversibly radially expanded and is arranged at a tensioning end of the housing,
    wherein the locking sleeve is embodied to introduce the locking ring into the grooves in the retraction direction of the tensioning piston and to retain the locking ring in the grooves of the tensioning piston, and
    wherein retraction of the tensioning piston into the piston bore of the housing is limited by interaction of the locking ring with the grooves.

2. Tensioning device according to claim 1, wherein the locking sleeve is embodied as a separate sleeve that is fixed to the housing.

3. Tensioning device according to claim 2, wherein the sleeve comprises an internally bent projection at the side of the housing which engages in a groove at the housing to fix the sleeve to the housing.

4. Tensioning device according to claim 2, wherein the sleeve comprises an internally bent projection on the tensioning side which retains the locking ring in the grooves of the tensioning piston.

5. Tensioning device according to claim 2, wherein the sleeve is formed by a meandering belt.

6. Tensioning device according to claim 1, wherein a stop is provided at the tensioning end of the housing, and the stop prevents the retraction motion of the tensioning piston when the stop contacts the locking ring.

7. Tensioning device according to claim 1, wherein the grooves surround the outer wall of the piston and are separated from each other by a wedge-shaped web.

8. Tensioning device according to claim 1, wherein the housing further comprises a threaded section formed on an outside circumference having a core diameter.

9. Tensioning device according to claim 8, wherein an outside diameter of the sleeve is smaller than the core diameter of the threaded section.

10. Method for activating a return interlock for a preassembled screw-in tensioner with a housing and a tensioning piston guided in a piston bore of the housing, wherein a first part of the return interlock is arranged at the housing and a second part of the return interlock is arranged at the tensioning piston separately from the first part, the method comprising:

screwing in the preassembled screw-in tensioner into a corresponding final assembly opening;

touching the tensioning element to be tensioned by the screw-in tensioner;

retracting the tensioning piston into the piston bore of the housing by further screwing in the screw-in tensioner into the final assembly opening; and interlocking the first part and the second part of the return interlock and activating the return interlock in the final assembly state, wherein retraction of the tensioning piston into the piston bore of the housing is limited by interaction of the second part of the return interlock with grooves provided on an outer wall of the tensioning piston.

* * * * *